Aug. 1, 1950　　　L. H. KAUPKE ET AL　　　2,517,439
BALER CONSTRUCTION
Filed Nov. 29, 1943　　　　　　　　　3 Sheets-Sheet 1
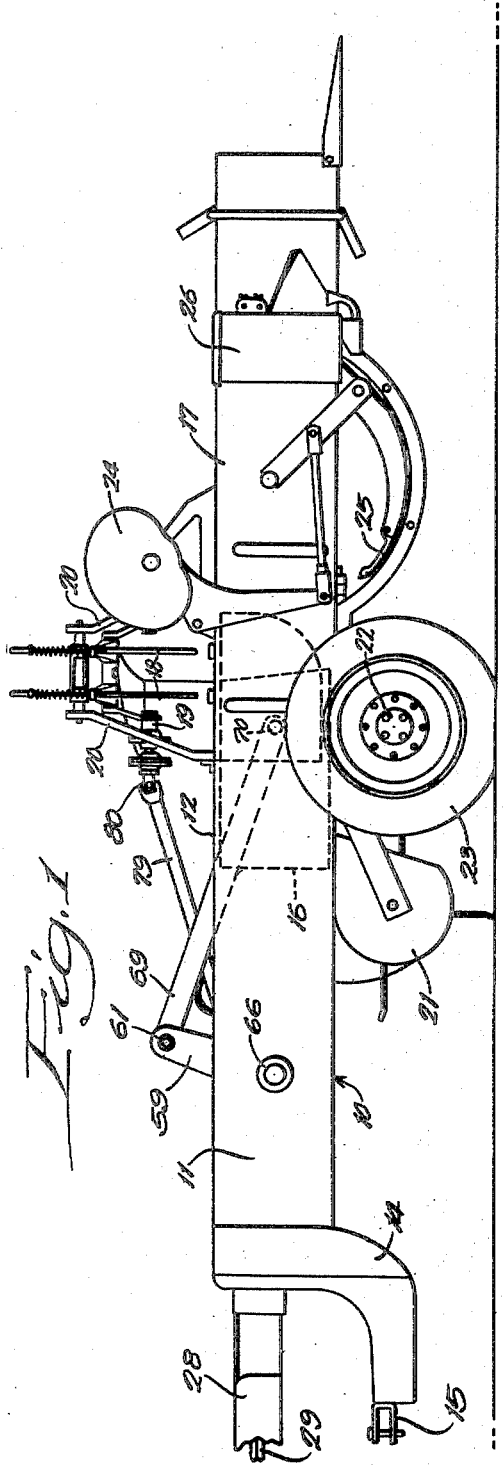
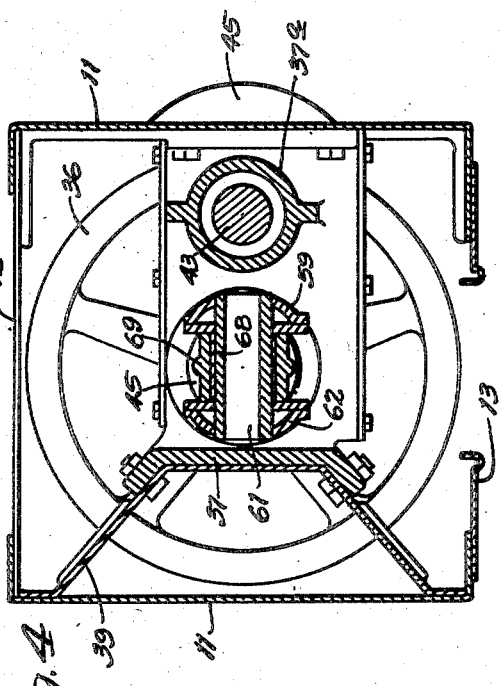
Inventors:
Lee H. Kaupke and
Russell R. Raney,
By Pane o Pippel
Attorney.

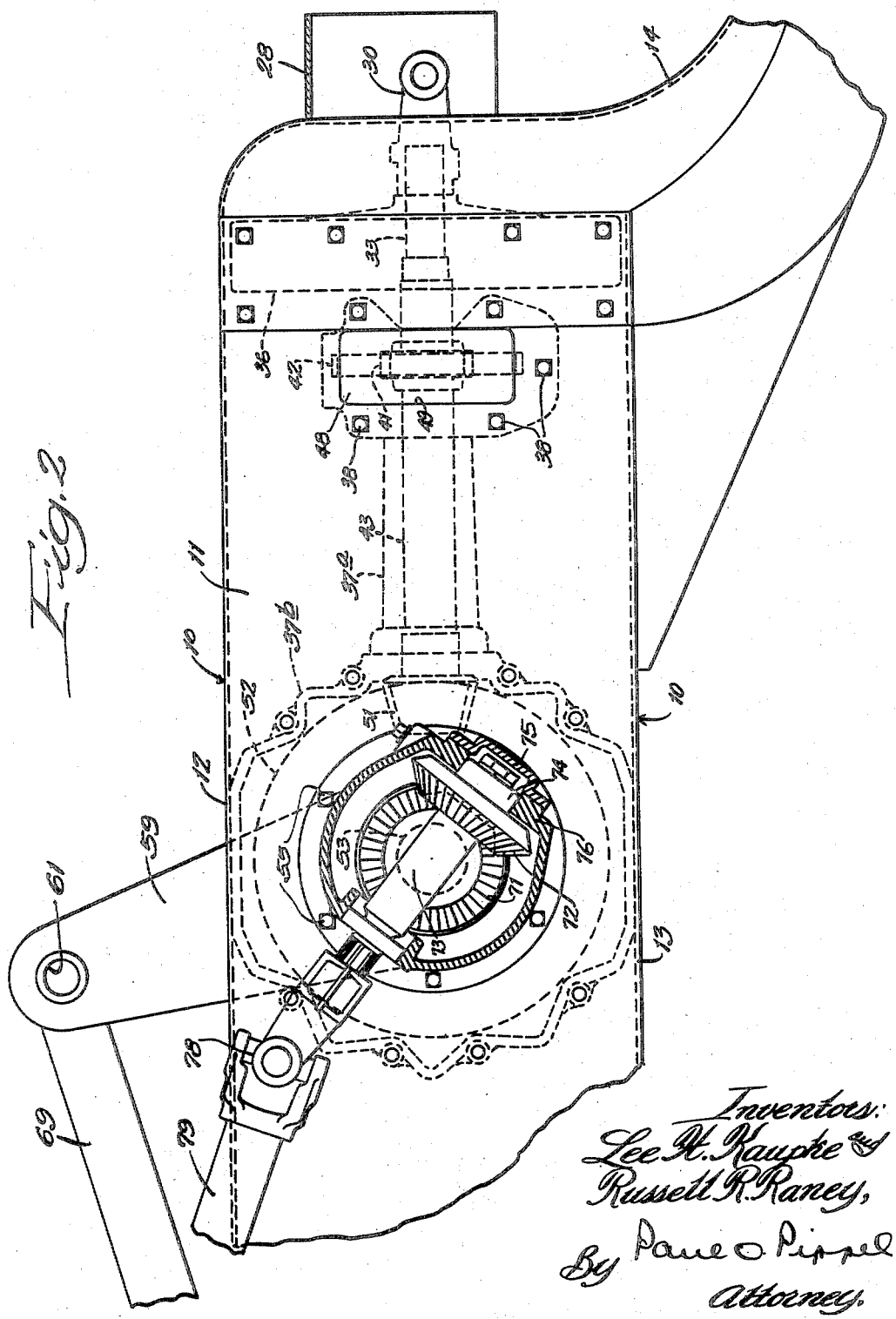

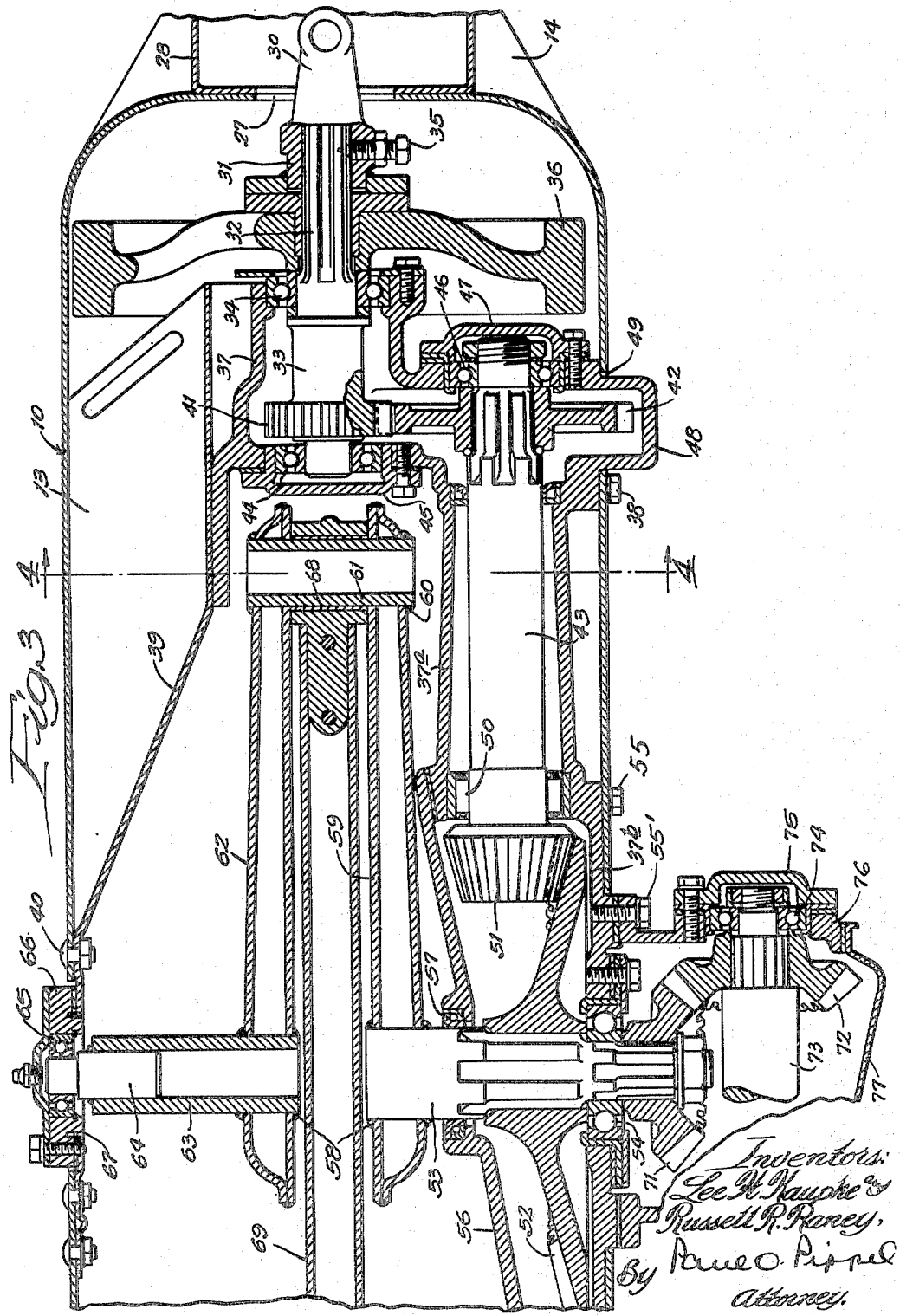

Patented Aug. 1, 1950

2,517,439

UNITED STATES PATENT OFFICE 2,517,439

BALER CONSTRUCTION

Lee H. Kaupke and Russell R. Raney, La Grange, Ill., assignors to International Harvester Company, a corporation of New Jersey Application November 29, 1943, Serial No. 512,088

8 Claims. (Cl. 100—3)

The invention relates to an improved baler construction for baling various kinds of crop material, such, for example, as hay.

Traveling field balers usually comprise a longitudinally disposed baling chamber pulled by a tractor, said bale chamber having associated therewith a plunger to compact the crop material in the chamber. The plunger mechanism is driven by a power take-off shaft from the tractor or by means of a separate engine attachment on the baler frame. Connected to the side of the baler frame is a pick-up device for picking up a windrow of crop material and, by means of a cross conveyor arrangement, the material elevated by the pick-up device is transferred into the baling chamber.

Heretofore, these machines have been relatively heavy and, consequently, costly.

With this general introduction, the invention, it will appear, more particularly relates to an improved baler construction wherein the driving parts are disposed in a novel, compact arrangement and made of light-weight but strong construction.

An object of the invention is to provide a novel baler frame housing construction serving to enclose an unusually compact arrangement of driving mechanism for operating the baling press plunger.

Another object is to streamline the appearance of this baler frame construction so that the driving parts will be enclosed where they will not prove dangerous to attendants, and, likewise, can be isolated from dirt and dust, thereby to prolong the life of the driving mechanism parts.

Another object is to enclose these driving parts in the forward end of the longitudinal baler frame so that in a novel manner the baler frame itself may be used as a hitch frame for directly connecting the baler to the draw-bar of a tractor.

Another object of the invention is to provide the main drive shaft entering the baling frame either from the power take-off shaft of the tractor or from an auxiliary engine attachment with a relatively small but high-speed flywheel disposed within the streamlined baler frame housing so that proper motion will be maintained by the driven parts of the transmission mechanism.

Still another object is to provide an improved transmission mechanism for driving the baling press plunger as well as an associated driven mechanism such as a packer structure for packing crop material into the bale chamber, coming from the pick-up cross conveyor.

Other objects no doubt will become apparent as this disclosure is more fully made.

All of these desirable objects are achieved in a preferred form by the structure shown in the accompanying sheets of drawings wherein the machine illustrated has a longitudinally disposed baler frame, the forward end of which is formed as a rectangular housing to which a downwardly and forwardly extending hitch bracket is rigidly attached, said bracket carrying a clevis for attachment to a tractor draw-bar. The hollow chamber provided is entered by the main drive shaft, such as the tractor power take-off shaft, and within said housing are suitably enclosed housing brackets and supports carrying gear-transmitting means in a novel arrangement for operating a reciprocatory plunger for compacting crop material within a bale-forming chamber at a rear portion of the baler frame. A flywheel is carried on the main drive shaft operating at high speed to keep up motion of the transmission mechanism, and by means of a novel auxiliary transmission arrangement power can be taken off for driving the packer mechanism associated with the bale chamber.

In the drawings:

Figure 1 is a general longitudinal side view of the improved baler;

Figure 2 is a general longitudinal enlarged detail view of the front end of the baler frame taken from the opposite side and showing in partial section the auxiliary power-transmitting arrangement for the packer structure;

Figure 3 is a general horizontal longitudinal sectional view through the structure shown in Figure 2 and exposing all of the interior power-transmitting parts; and Figure 4 is a detail cross-sectional view taken on the line 4—4 of Figure 3 looking in the indicated direction.

Looking generally at Figure 1, it will be seen that a baler frame is generally shown at 10, the same being longitudinally disposed, having opposite side walls 11, a top 12, and a bottom 13, which is partially open. As shown in Figure 4, this arrangement provides an enclosed body structure generally rectangular in cross section. At the front end of this baler frame housing is rigidly connected a sturdy downwardly and forwardly extending hitch frame 14 including at its front end a clevis 15 for attachment to the draw-bar of a tractor. About midway in this baler body is, as shown in Figure 1, a plunger 16 which compacts crop material in the usual bale chamber portion 17, said bale chamber 17 in this embodiment receiving crop material through a side opening by means of orbitally moving packers 18 carried on a longitudinal crank-shaft 19 by means of a framework 20 disposed on top of the baler frame. This packer structure 18 receives the crop material from a cross conveyor, not shown as it is standard in these machines, which conveyor in turn receives the material handled from a pick-up device 21 disposed at the side of the longitudinal baler frame and serving to pick up a windrow of crop material from the ground, which material may, for example, be hay. The baler frame is carried on a transverse axle 22 supported on a pair of laterally spaced carrying wheels 23, only one of which is shown.

At the rear end of the baler chamber is a binder mechanism including a tying means, generally shown at 24, and a needle at 25 receiving a tying strand, such as twine, from a holder 26 mounted on the side of the baler housing near its rear end. This tying mechanism acts to tie a formed bale in the chamber with twine and is only generally shown herein because it forms no part of the present invention.

Looking now to Figures 2 and 3, it will be seen that the sides 11 of the baler frame housing or body are of streamlined contour in that they are curved forwardly and inwardly and provided at their longitudinal center with an opening 27, there being a cylindrical shield 28 weldingly secured to the front end of the housing to form a shield for a power take-off shaft 29 extending from the tractor, not shown. This power take-off shaft 29 is connected to a drive shaft 30. This shaft 30 conseqently is driven at power-take-off shaft or engine speed. It therefore is a high-speed shaft and at its rear end is hollowed out, as at 31, for spline connection to the splined end 32 of a rearwardly and longitudinally extending shaft 33 journaled in a bearing 34. By means of a set screw 35, the drive shaft 30 is firmly secured to the spline 32 of said shaft 33. A small diameter, statically and dynamically balanced flywheel 36 is made functionally fast to the spline 32 of shaft 33 to rotate therewith, the same snugly fitting within the cross-sectional shape of the baler frame housing or body 10 and at the forward end thereof.

The bearing 34, heretofore described, is carried in the front end of a longitudinally disposed sleeve of a hollow bracket 37, which bracket is suitably secured to the side walls 11 such as by means of a bolt 38, and by means of a spacer bracket 39 of light-weight construction, secured, as at 40, to the opposite side wall 11. The bracket 37 and the bracket 39, of course, are suitably united to be functionally integral and rigid. The shaft 33 extends rearwardly behind the bearing 34 and carries a spur gear 41 meshing a spur gear 42 to one side thereof and made fast to a longitudinal shaft 43 at one side of the body 10, there being a rear bearing support 44 for the shaft 33, which bearing 44 also is journaled in a carrier 45 secured in an opening in the bracket 37. The front end of the shaft 43 is journaled in a bearing 46 by means of a carrier 47, also mounted in an extension of the internal bracket 37. The bracket 37 has a side extension 48 projecting laterally a slight distance through a hole 49 in the side wall 11 whereby a gear 42 of the proper size can be used.

The shaft 43 extends rearwardly through a sleeve extension 37a of the bracket 37, said sleeve carrying a bearing 50, as shown, the rear end of said shaft 43 extending backwardly of the bearing 50 and carrying a bevel pinion 51. The bevel pinion 51 is in mesh with a large bevel gear 52 splined to a cross shaft 53 journaled in a bearing 54 in an extension 37b of the bracket extension 37a, securing means 55 being provided firmly to anchor said bracket part in the side wall 11 of the housing. It is to be noted that a cover plate 56 within the housing 10 provides an enclosure for the gears 51 and 52, thus making it possible to maintain lubricant and keep out dirt, a suitable shaft seal 57 being provided to aid in achieving this result.

The inner end of the shaft 53 projects through the cover 56 where it has weldingly secured thereto, as at 58, a fabricated hollow light-weight crank arm 59. Said crank arm 59 at its free end, as at 60, is weldingly connected to a transverse sleeve or wrist pin 61. At the opposite end of said transverse sleeve 61 is a similar hollow light-weight fabricated crank arm 62 secured to a transverse light-weight sleeve 63 coaxial with the shaft 53. Said sleeve shaft 63 receives a trunnion shaft 64 journaled in a bearing 65 held by a carrier 66 in the adjacent side wall 11, as at 67. It will be observed that the sleeve 63 is welded to the trunnion 64.

The two crank arms 59 and 62 are connected to the sleeve 61 in spaced-apart relation to receive between them a bearing 68 in which is journaled a longitudinally and rearwardly extending hollow fabricated light-weight connecting rod 69 pivotally connected at 70 to the plunger 16 in the bale chamber 17.

The shaft 53 has a reduced end extending laterally out through the wall 11 past the bearing 54 where it fixedly carries a bevel pinion 71 meshing a bevel gear 72 splined to a longitudinal shaft 73 journaled at its front end in a bearing 74 held in place in a bracket 76 secured to the housing part 37b by bolt 55' at the side wall 11, as shown in Figure 3 and covered by a cap 75. This gear nest 71, 72 is enclosed in a housing 77 to keep out dirt and the shaft 73 extends upwardly to be connected by a universal joint 78 to an upwardly and rearwardly extending shaft 79 having connection by means of a universal joint 80 to the longitudinal crank-shaft 19, heretofore described, for transmitting drive to the packer members 18.

In operation, power is applied either from an auxiliary engine or, as shown, the tractor power take-off shaft 29 to the high-speed drive shaft 30 as the baler is proceeding along a field picking up the crop with the pick-up 21 and moving it, by means of the packers 18, into the bale chamber 17 for compression by the reciprocating plunger or ram 16. The drive is transmitted from shaft 30 to shaft 33, then through gears 41 and 42 to shaft 43; then by gears 51 and 52 to drive shaft 53, which causes operation of crank arms 59 and 62 conjointly to move the connecting rod 69 and thus reciprocate the plunger 16. At the same time, power is taken off through gears 71 and 72 to drive shaft 73 and the packer crank-shaft 19. In practice, the tying mechanism 24 and 25 is driven from this crank-shaft 19. All of the driving portions shown in Figure 3, with the exception of the auxiliary drive 71, 72, are enclosed within the baler frame formed as a rectangular longitudinal body or housing, all parts being enclosed and of light weight. The flywheel 36, likewise enclosed within this housing and operating at high speed, serves to keep up the motion required for proper functioning of the transmission mechanism therebehind.

From this disclosure it will be seen that an improved baler construction has been provided which achieves the objects heretofore recited.

It is the intention to cover all such modifications of the example herein shown which do not depart from the spirit and scope of the invention as defined in the following claims.

What is claimed is:

1. In a baler, a longitudinal body providing at a mid portion a baler chamber including a reciprocatory plunger, said body at its front end carrying a hitch part, a housing supported within the body between the hitch part and chamber, said housing journaling a first longitudinal drive shaft, a second longitudinal shaft journaled in a housing part at one side of but within the body and geared to said first drive shaft, a transverse stub shaft journaled in the body and geared to said second longitudinal shaft, a housing part enclosing the gear connection between said last two shafts, a second stub shaft journaled in the body coaxially with the first stub shaft, cranks respectively connected on the inner ends of the stub shafts, a wrist pin connecting the free ends of the cranks for conjoint movement, and a connecting rod journaled on the wrist pin at one end and at its other end connected to actuate the plunger, said connecting rod being longitudinally disposed in the vertical plane passing through the drive shaft axis.

2. In a baler, a longitudinal hollow body providing at a mid portion a baler chamber including a reciprocatory plunger, said body at its front end carrying a hitch part, a housing supported within the body between the hitch part and chamber, said housing journaling a first longitudinal drive shaft, a second longitudinal shaft journaled in a housing part at one side of but within the body and geared to said first drive shaft, a transverse stub shaft journaled in the body and geared to said second longitudinal shaft, a housing part enclosing the gear connection between said last two shafts, a second stub shaft journaled in the body coaxially with the first stub shaft, cranks respectively connected on the inner ends of the stub shafts, a wrist pin connecting the free ends of the cranks for conjoint movement, a connecting rod journaled on the wrist pin at one end and at its other end connected to actuate the plunger, and a flywheel fast on the drive shaft and located within the body.

3. In a baler, a longitudinal hollow body providing at a mid portion a baler chamber including a reciprocatory plunger, said body at its front end carrying a hitch part, a housing supported within the body between the hitch part and chamber, said housing journaling a first longitudinal drive shaft, a second longitudinal shaft journaled in a housing part at one side of but within the body and geared to said first drive shaft, a transverse stub shaft journaled in the body and geared to said second longitudinal shaft, a housing part enclosing the gear connection between said last two shafts, a second stub shaft journaled in the body coaxially with the first stub shaft, cranks respectively connected on the inner ends of the stub shafts, a wrist pin connecting the free ends of the cranks for conjoint movement, a connecting rod journaled on the wrist pin at one end and at its other end connected to actuate the plunger, said connecting rod being longitudinally disposed in the vertical plane passing through the drive shaft axis, and a flywheel secured to the drive shaft forwardly of the front end of the second longitudinal shaft, said flywheel being located inside the body.

4. In a baler, a longitudinal hollow body rectangular in cross section and providing at a mid portion a baler chamber including a reciprocatory plunger, said body presenting a relatively smooth exterior surface of streamlined form, a housing supported inside the body ahead of the chamber, said housing journaling a first longitudinal drive shaft, a second longitudinal shaft journaled in a housing part at one side of but within the body and geared to said first drive shaft, a transverse shaft and crank structure journaled in the body and geared to said second longitudinal shaft, a connecting rod operatively connected between the crank structure and the plunger, and a flywheel on the drive shaft and transversely disposed within said body.

5. In a baler, a longitudinal hollow body providing at a mid portion a baler chamber including a reciprocatory plunger, said body at its front end carrying a hitch part, a housing supported within the body between the hitch part and chamber, said housing journaling a first longitudinal drive shaft projecting from the body adjacent the hitch part and adapted to be driven by a tractor power take-off, a second longitudinal shaft journaled in a housing part at one side of but within the body and geared to said first drive shaft, a transverse shaft and crank structure journaled in the body and geared to said second longitudinal shaft, a connecting rod operatively connected between the crank structure and plunger to actuate the plunger, and a flywheel keyed to said first longitudinal drive shaft.

6. In a baler, a longitudinal hollow body providing at a mid portion a baler chamber including a reciprocatory plunger, a housing supported within the body, said housing journaling a first longitudinal drive shaft, a second longitudinal shaft journaled in a housing part at one side of but within the body and geared to said first drive shaft, a transverse stub shaft journaled in the body and geared to said second longitudinal shaft, a housing part enclosing the gear connection between said last two shafts, a second stub shaft journaled in the body coaxially with the first stub shaft, cranks respectively connected on the inner ends of the stub shafts, a wrist pin connecting the free ends of the cranks for conjoint movement, a connecting rod journaled on the wrist pin at one end and at its other end connected to actuate the plunger, said connecting rod being longitudinally disposed, and a shaft carried outside the body to drive an operative auxiliary for the baler, said last shaft geared to receive power from an end of one of the stub shafts projected from the body.

7. In a baler, a longitudinal hollow body providing at a mid portion a baler chamber including a reciprocatory plunger, a housing supported within the body, said housing journaling a first longitudinal drive shaft, a second longitudinal shaft journaled in a housing part at one side of but within the body and geared to said first drive shaft, a transverse stub shaft journaled in the body and geared to said second longitudinal shaft, a housing part enclosing the gear connection between said last two shafts, a second stub shaft journaled in the body coaxially with the first stub shaft, fabricated light weight cranks respectively connected on the inner ends of the stub shafts, a wrist pin connecting the free ends of the cranks for conjoint movement, a connecting rod journaled on the wrist pin at one end and at its other end connected to actuate the plunger, and a flywheel fastened on the first drive shaft.

8. In a baler, a longitudinal hollow body providing at a mid portion a baler chamber including a reciprocatory plunger, said body at its front end carrying a hitch part, a housing supported within the body between the hitch part and chamber, said housing journaling a first longitudinal drive shaft, a second longitudinal shaft journaled in a housing part at one side of but within the body and geared to said first drive shaft, a transverse stub shaft journaled in the body and geared to said second longitudinal shaft, a housing part enclosing the gear connection between said last two shafts, a second stub shaft journaled in the body coaxially with the first stub shaft, hollow fabricated light weight cranks respectively connected on the inner ends of the stub shafts, a hollow wrist pin connecting the free ends of the cranks for conjoint movement, a light weight fabricated connecting rod journaled on the wrist pin at one end and at its other end connected to actuate the plunger, and a flywheel interposed in the gearing within said body.

LEE H. KAUPKE.
RUSSELL R. RANEY.

REFERENCES CITED

The following references are of record in the file of this patent:

UNITED STATES PATENTS

| Number | Name | Date |
|---|---|---|
| 939,466 | Rothwell | Nov. 9, 1909 |
| 1,205,980 | Dudley | Nov. 28, 1916 |
| 1,263,001 | Swofford | Apr. 16, 1918 |
| 1,912,998 | Paul et al. | June 6, 1933 |
| 2,038,809 | Tallman et al. | Apr. 28, 1936 |
| 2,068,886 | MacDonald | Jan. 26, 1937 |
| 2,355,645 | Haase | Aug. 15, 1944 |
| 2,355,646 | Haase | Aug. 15, 1944 |